Aug. 18, 1970
H. S. WOLFE
3,524,278
FLOATING FISH BASKET
Filed Jan. 29, 1968
3 Sheets-Sheet 3
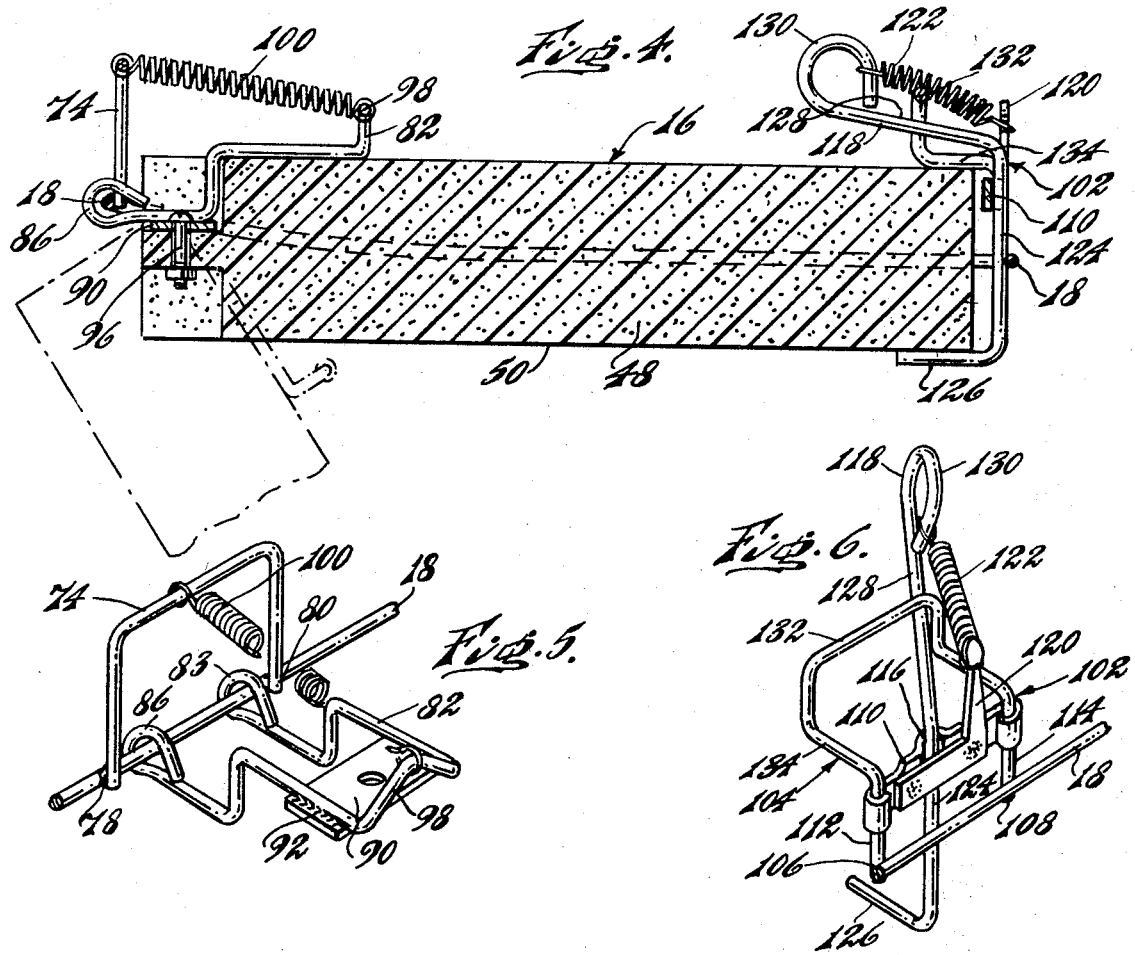
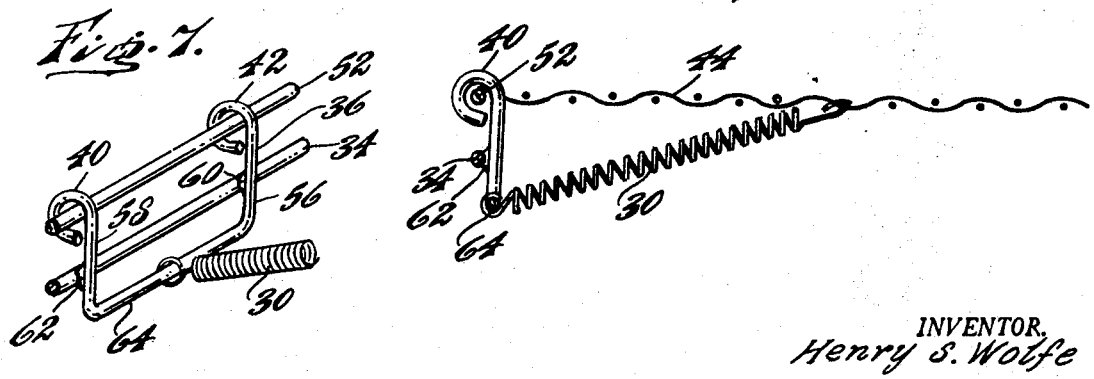
INVENTOR.
Henry S. Wolfe
BY Karl L. Spivak
ATTORNEY

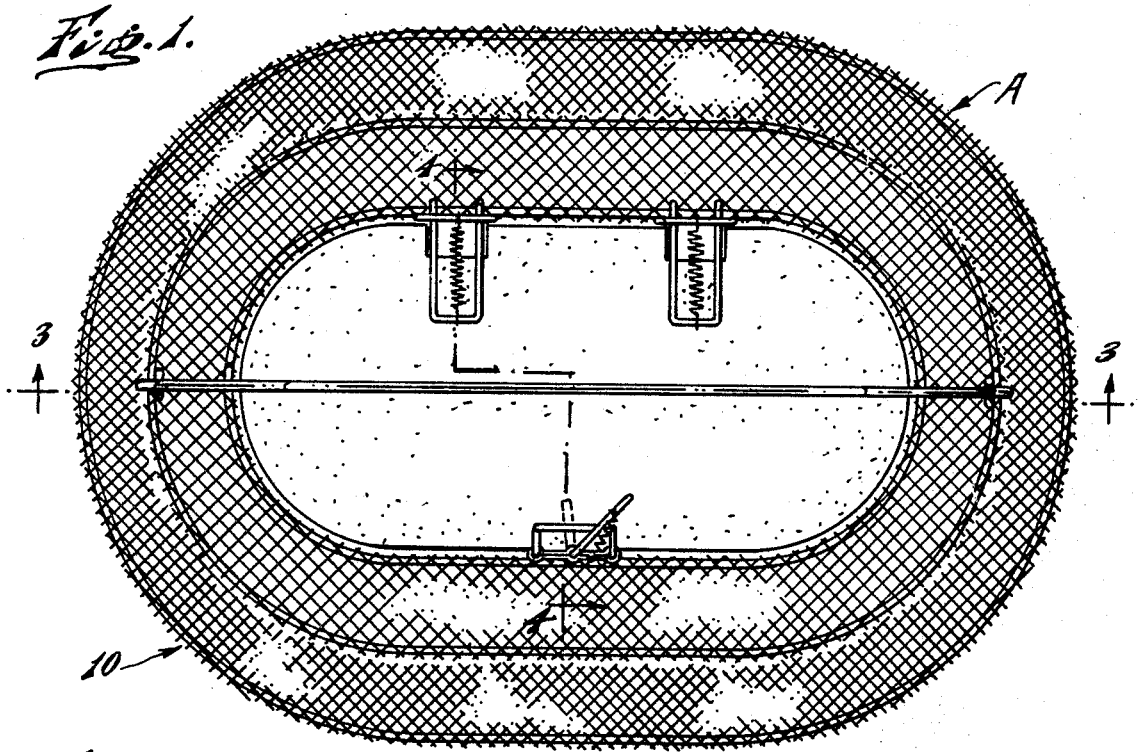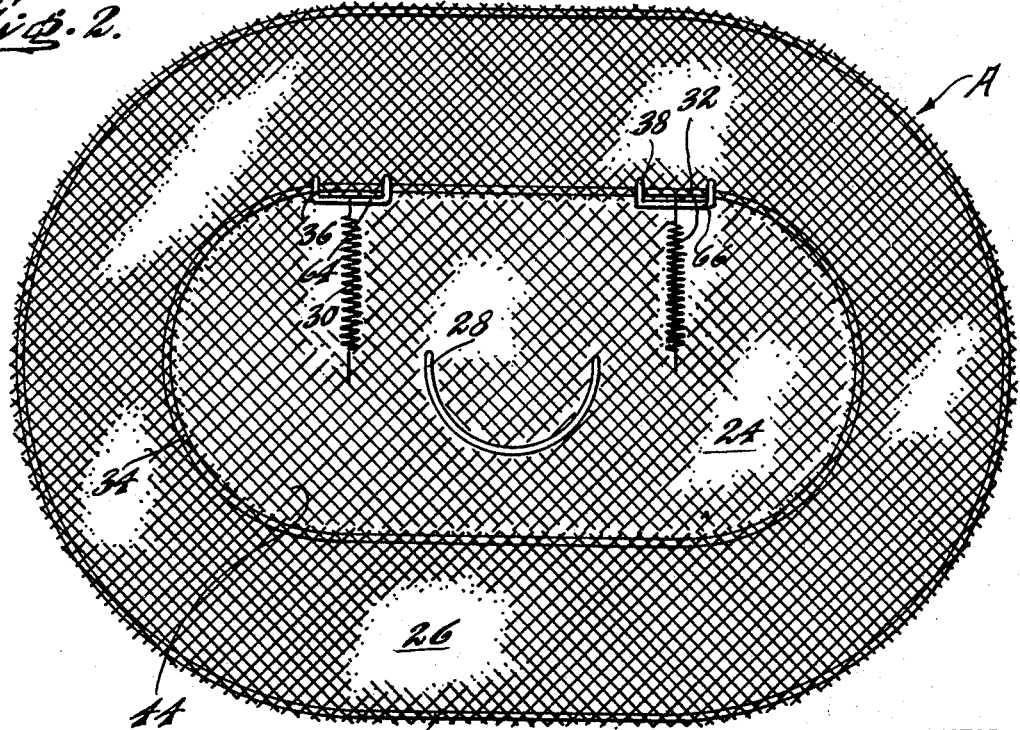

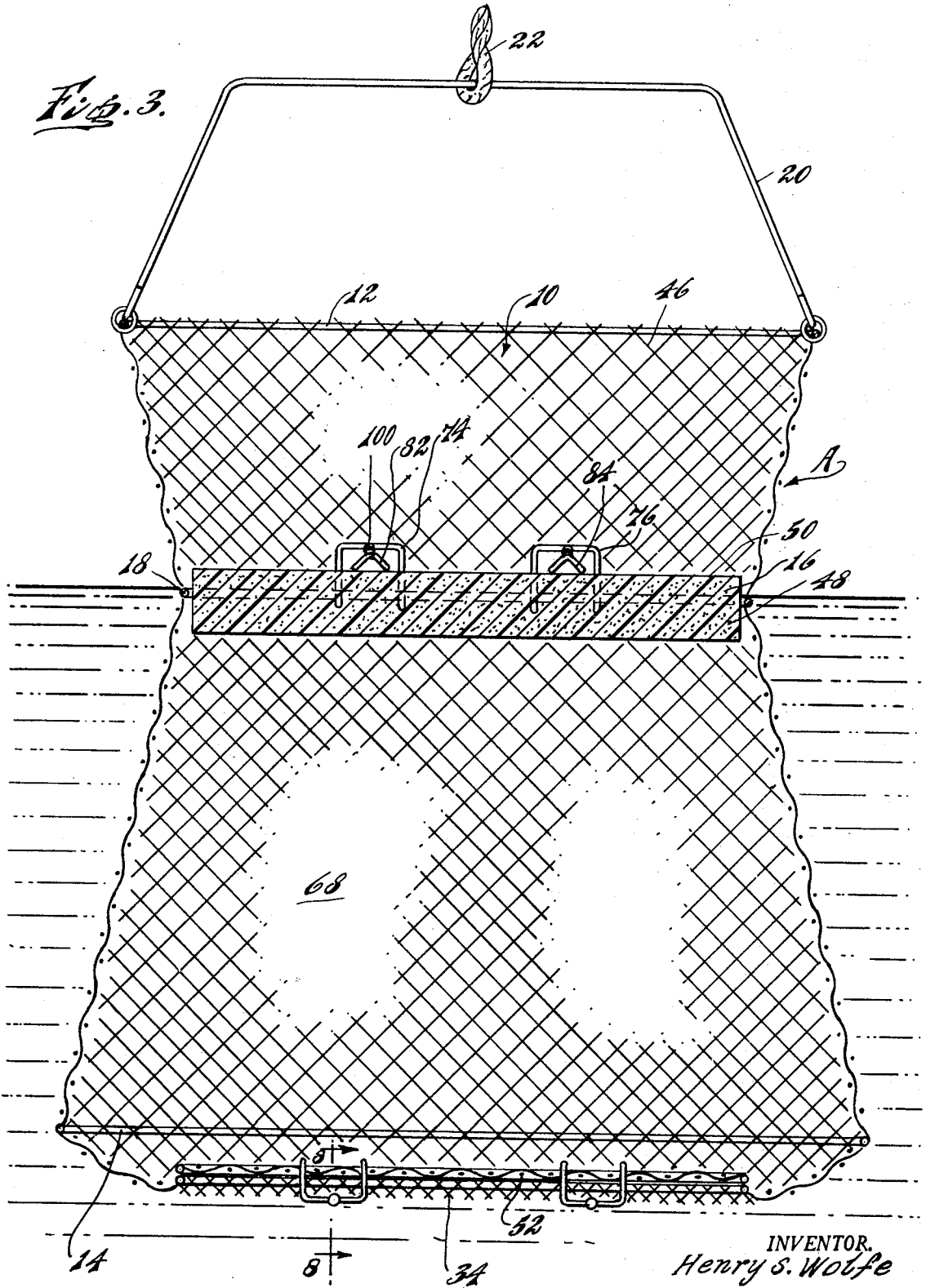

United States Patent Office

3,524,278
Patented Aug. 18, 1970

3,524,278
FLOATING FISH BASKET
Henry S. Wolfe, Jenkintown, Pa., assignor to Gladding Corporation, South Otselic, N.Y., a corporation of New York
Filed Jan. 29, 1968, Ser. No. 701,411
Int. Cl. A01k 97/04
U.S. Cl. 43—55                                    3 Claims

ABSTRACT OF THE DISCLOSURE

A floating fish basket comprising a collapsible wire mesh container including a medially positioned top closure therefor constructed of a material having sufficient buoyancy to prevent the basket from sinking to the bottom. The buoyant closure also includes a novel locking device that insures positive closure even when the fish basket is attached to a moving boat.

---

This invention relates to the general art of sporting equipment and more particularly, is directed to a container for receiving and holding fish after they have been caught to retain them in a fresh and live condition.

Prior workers in the field have devised many types of fish holding containers to enable fishermen to maintain their fish live after they have been caught. I am aware of one prior art fish net comprised of a tubular open mesh fabric and provided with a hook portion for attaching to the gunwale of a boat. Such a device does not include a suitable top closure, and in addition, is subject to the variations in elevation of the boat caused by waves, tides and motions of the boat's occupants.

Another earlier worker in the field has provided a floating fish bag comprising a container consisting of a single sheet of material and having openings therein through which water may pass. Arranged about the top of the container is a floatation cylindrical ring of cork or similar material of sufficient buoyancy to float the entire basket. The device has serious drawbacks in that the contents of the fish bag were not readily visible and that a suitable top closure was not provided.

Another worker has provided a similar container wherein the sides were pleated to assist in collapsing the container when not in use. A circular air filled chamber was provided and affixed to the top of the container for floatation purposes. The top comprised a sheet of material with crossed slots to permit insertion of all fishes as they were caught. This device was generally satisfactory in use but suffered from a failure to provide an adequate top locking device to prevent fish from finding their way out of the container under all circumstances of use.

In still another prior art device of which I am aware, a collapsible net formed into a fish bag was attached to a floatation ring by lacing which is grouped around both the ring and the top of the net. A circular sheet of rubberized fabric affixes to the top of the fish bag at the floatation ring for closure purposes and a diametrical slit is provided in the top sheet for stretching open to provide an inlet in the sack through which the fish may be inserted. This device was subject to wear and had no provision for positively locking the catch within the container.

It is therefore an object of this invention to provide an improved device of the type set forth.

It is a further object of the instant invention to provide a combination floating fish basket composed of collapsible mesh fabric and including therein an access door which serves also to buoyant the basket in the water.

It is another object of the instant invention to provide an improved floating fish basket of the type set forth formed from a lightweight and flexible wire material capable of being submerged in water for storing freshly caught fish therein and also being suitable for collapsing for easy transportation and storage when not actually in use.

It is another object of the instant invention to provide a novel floating fish basket including a buoyant door therein featuring novel and positive locking means.

It is a further object of this invention to provide a novel floating fish basket provided with a cover which incorporates features that permit the container to float, the cover serving also to effectively close the top opening of the container and in addition being so arranged that additional fish may be added to the container at will when so desired by the fisherman.

It is another object of the instant invention to provide a novel floating fish basket having an opening in the top thereof affording access to the interior of the container and with a closure which automatically closes the said container opening when the container is partially submerged in the water.

It is another object of the instant invention to provide a floating fish basket having novel top locking means which permit the container to be used either while fishing or while being towed in a boat without giving previously caught fish the opportunity for escape.

It is a further object of the instant invention to provide a novel floating fish basket including a spring controlled trap door for normally closing the door and with the door capable of being conveniently opened and closed and latched or unlatched to permit ready insertion and removal of fish.

It is another object of the instant invention to provide a simply constructed, inexpensive, serviceable device which is buoyant, adapted for attaching to a boat, or the like, and designed for quick and easy insertion of the fish therein in a safety confined condition.

It is another object of the instant invention to provide a novel floating fish basket that is rugged in construction, inexpensive in manufacture, and troublefree when in use.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a top plan view of a floating fish basket constructed in accordance with the instant invention.

FIG. 2 is a bottom plan view thereof.

FIG. 3 is a cross-sectional view of the flotation door taken along line 3—3 of FIG. 1, looking in the direction of the arrows.

FIG. 4 is a cross-sectional view taken along line 4—4 of FIG. 1, looking in the direction of the arrows showing the flotation door is closed and locked position.

FIG. 5 is a partial perspective view of the flotation door hinge.

FIG. 6 is a partial perspective view of the flotation door lock.

FIG. 7 is a partial perspective view of the bottom gate hinge.

FIG. 8 is a side elevational view of the hinge and spring of the bottom gate.

Although specific terms are used in the following description for the sake of clarity, these terms are intended to refer only to the particular structure of my invention selected for illustration in the drawings and are not intended to define or limit the scope of the invention.

Referring now to the drawings, I show in FIGS. 1, 2 and 3, a floating fish basket generally designated A comprising a generally cylindrical container 10 comprising a collapsible, rust resistant, lightweight wire mesh fabric 46 which may be fabricated to any convenient cross-sectional configuration as desired. The container 10 terminates upwardly in a peripheral strengthening ring 12 which serves to define the shape of the top opening and to secure the top of the mesh fabric 46. A bottom peripheral ring 14 may be provided near the bottom of the container 10 to strengthen the floating fish basket and also to define the bottom configuration of the container. A flotation door 16 affixes to the container 10 intermediate the top and bottom rings 12, 14 and is hingedly attached to the medial ring 18 as will hereinafter be more fully set forth. The flotation door 16 is fabricated from a light, buoyant material of sufficient buoyancy to support the entire weight of the container 10 when submerged in the water. A material such as Styrofoam plastic 48 of sufficient thickness and rigidity have been found suitable for this purpose. A waterproof cover 50 which may be of polyethylene plastic, envelopes the plastic material 48 to form a lightweight, durable, buoyant assembly.

A top carrying bar 20 connects diametrically at either end thereof to the top ring 12 to provide both a convenient handle for carrying the fish basket and also as a centrally positioned strap for affixing and anchoring line 22 which may be connected to a boat, wharf or other object as desired to maintain the floating fish basket in the desired location. The top strap 20 affixes hingedly to the ring 12 in a manner to permit the strap to be folded substantially parallel to the ring 12 when the floating fish basket is not in use. In this manner, the entire device may be stored in as little space as possible when not in use.

The bottom door 24 includes a peripheral ring 52 and mesh fabric 44 and hingedly affixes within the bottom construction 26 of the floating fish basket to the bottom access ring 34. The bottom door 24 interiorly overlies the fixed ring 34 and pivots inwardly through the action of the wire hinges 36, 38. The springs 30, 32, respectively, bias between the hinges 36, 38 and the wire fabric 44 of the bottom gate 24 to maintain the door 24 in closed position. The handle 28 is also hingedly connected to the bottom door fabric 44 in such a manner as to fold flat when not in use and to turn at right angles thereto to permit grasping when operating the bottom door. The operation of the hinges 36, 38 can best be observed in FIGS. 2, 7 and 8 where it can be observed that the hinge 36 is substantially V-shaped and terminates upwardly in a pair of spaced loops, 40, 42 which hingedly engage the bottom door ring 52. Each leg 56, 58 rigidly affixes to the bottom access ring 34, as by spot welds 60, 62 thereby permitting the door 24 to pivot inwardly about the ring 34. The springs 30, 32, respectively, bias between the webs 64, 66 of the hinges 36, 38 and the fabric 44 of the bottom door 24 thereby urging the bottom door ring 52 into overlying juxtaposition with regard to the bottom fixed ring 34.

Referring now to FIGS. 4 and 5, it will be seen that the flotation door 16 pivots inwardly into the fish holding area 68 of the floating fish basket A about the medial ring 18 by means of the composite spring hinges 70, 72. Each hinge 70, 72 comprises an inverted, U-shaped fixed element 74, 74 which may be spot welded to the medial ring 18 as at the termini 78, 80. The movable elements 82 and 84 of the hinges 70, 72 terminate outwardly in spaced loops 86, 88 which engaged the medial ring 18 intermediate the fixed element termini 78, 80 to permit pivoting action of the flotation door 16 about the ring 18. A mounting plate 90 secures to the movable element 82 in a weld or solder joint 92 and is provided with a bolt hole 94 to receive the bolt 96 which secures the respective movable elements 82, 84 to the flotation door construction in any well-known manner. The movable elements 82, 84 terminate inwardly in a raised web 98 which serves as a point of attachment for the door closing spring 100. The spring 100 biases between the raised web 98 at one end of the composite spring hinge 70, 72 and the respective raised portion of the fixed element 74, 76 thereby continually urge the door 16 to the horizontal position in alignment with the medial ring 18. Referring now to FIGS. 4 and 6, it will be seen that the composite door latch 102 comprises a stationary section 104 which is affixed to the medial ring 18 by spot welds at the termini 106, 108. A yoke 110 horizontally adjoins the legs 121, 114 of the fixed latch portion 104 and provides a vertical bearing 116 which journals the operative portion 118 of the latch 102 as will hereinafter be more fully set forth. An arm 120 rises vertically from the yoke 110 to provide one fixed terminus for the door closure spring 122.

In the operative latch portion 118 comprises a vertical rod portion 24 which vertically rotates within the yoke bearing 116 for latching and unlatching purposes. The rod portion 124 terminates downwardly in a door engaging latch 126 which is turned at right angles to the vertical portion 124. The vertical rod portion 124 terminates upwardly in a operating lever 128 which is also bent at substantially a 90° angle from the vertical. The operating lever 128 terminates outwardly in a fixed loop 130 which serves as the terminus for the second end of the spring 122. The operating lever reciprocates horizontally between the extremities of the raised web 132 which connects the legs 112, 114 of the fixed portion 104 of the door latch assembly 102. It should be noted in FIG. 6 that the latch 126 is angularly bent with respect to the operating lever 128, a sufficient amount to permit the door construction 16 to pivot downwardly past the latch 126 when the operating lever 128 is rotated against the left leg 112 of the fixed latch portion. When the operating lever 128 is rotated against the right leg 114 of the fixed latch portion 104, as illustrated in FIG. 6, the latch 126 points radially and engages the bottom of the flotation door 16 as illustrated in FIG. 4. It should be noted that the fixed arm 120 is positioned along the right side of the door latch assembly 102. In this manner, the spring 122 which biases between the arm 120 and loop 130 of the operative latch portion 118 serves to continually pull the operating lever in the direction of the right leg 114. It is thus observed that the spring 122 continuously serves to pull the door latch assembly into position to maintain the door 16 in latched position.

It is thus demonstrated that the door latch assembly 102 serves to maintain the flotation door 16 in a normally closed position thereby positively closing the opening at the medial ring 18 to prevent fish retained within the area 68 from escaping. In order to operate the door latch 102, all that is required is to push the operating lever 128 to the left, against leg 112. In this manner, the vertical rod 124 rotates within the bearing 116 and the latch 126 rotates free from engagement under the bottom of the flotation door 16. Continuous thumb pressure on the operating lever 128 is required to prevent the spring 122 from pulling the latch 126 back into engagement. With the latch 126 thus disengaged from the bottom of the door 16, the flotation door may then be pushed downwardly against the bias of the hinged springs 100 to thus expose the interior of the fish holding area 68. Upon placing fish within the area 68, pressure on the flotation door 16 may be released and the spring 100 will automatically serve to pull the flotation back into horizontal position against the door stop portions 134 of the fixed latch assembly 104. The spring 122 biases between the arm 120 and the loop 130 and automatically pulls the operating lever 128 to the right, thereby latching the flotation door in closed and locked position.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:
1. In a floating fish basket, the combination of
(A) collapsible enclosure means,
  (1) said means terminating upwardly in a top opening,
    (a) said opening being defined by a peripheral medial ring,
  (2) said means terminating downwardly in a bottom opening,
    (a) said bottom opening being defined by a peripheral bottom ring;
(B) a hinged door interiorly overlying the said bottom ring,
  (1) said door pivoting inwardly from the said bottom ring,
  (2) said door being equipped with spring means urging the said bottom door into overlying engagement with the said bottom ring;
(C) flotation means arranged within the said medial ring and pivotally closing the said top opening,
  (1) said floatation means having sufficient buoyancy to float the entire floating fish basket when emerged in water,
  (2) said floatation means pivoting inwardly into the interior of the said basket about a portion of the said medial ring;
(D) spring means urging the said floatation means into alignment with the said medial ring; and
(E) operable latch means to releasably engage the said floatation means in a position to close the said top opening,
  (1) the said latch means include a fixed portion affixed to the said medial ring and an operative portion rotatively journaled in the said fixed portion, said fixed portion including means to prevent upward movement of the said floatation means.

2. The invention of claim 1 wherein the said operative portion includes a door latch and a spring, said spring biasing between the fixed portion and the operative portion, the said spring serving to continuously pull the door latch into locking engagement under the said floatation means.

3. The invention of claim 1 wherein the said operative portion includes a vertically rotating member, said member terminating downwardly in a door latch bent at right angles thereto and terminating upwardly in an operating lever bent at right angles thereto, said latch and said lever lying in different vertical planes.

References Cited

UNITED STATES PATENTS

| 949,843 | 2/1910 | Reeve et al. | 292—228 |
| 3,233,279 | 2/1966 | Edgar | 43—55 X |
| 3,381,408 | 5/1968 | Nishimura | 43—55 |

HUGH R. CHAMBLEE, Primary Examiner